US012746728B2

(12) United States Patent
Wang

(10) Patent No.: US 12,746,728 B2
(45) Date of Patent: Sep. 29, 2026

(54) BUCKLE ASSEMBLY, PRESSING AND CUTTING JIG, AND METHOD AND APPARATUS FOR MANUFACTURING PACKAGE STRUCTURE

(71) Applicant: BOE TECHNOLOGY GROUP CO., LTD., Beijing (CN)

(72) Inventor: Wenbin Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 221 days.

(21) Appl. No.: 18/694,946

(22) PCT Filed: Feb. 22, 2023

(86) PCT No.: PCT/CN2023/077562

§ 371 (c)(1),
(2) Date: Mar. 22, 2024

(87) PCT Pub. No.: WO2024/174115

PCT Pub. Date: Aug. 29, 2024

(65) Prior Publication Data

US 2025/0115006 A1 Apr. 10, 2025

(51) Int. Cl.

*B29C 65/74* (2006.01)
*B29C 65/58* (2006.01)
*B29L 31/34* (2006.01)

(52) U.S. Cl.

CPC ............ *B29C 65/749* (2013.01); *B29C 65/58* (2013.01); *B29L 2031/3481* (2013.01)

(58) Field of Classification Search

CPC ... B29C 65/749; B29C 65/58; B29C 65/7844; B29C 66/7465; B29C 2793/00; B29C 45/00; B29L 2031/3481

See application file for complete search history.

(56) References Cited

FOREIGN PATENT DOCUMENTS

| | | | | |
|---|---|---|---|---|
| CN | 105682395 A | * 6/2016 | | H05K 5/02 |
| CN | 110126196 A | 8/2019 | | |
| CN | 213876814 U | 8/2021 | | |
| CN | 216286739 U | 4/2022 | | |
| CN | 216927631 U | 7/2022 | | |
| CN | 217156806 U | 8/2022 | | |
| CN | 218124742 U | 12/2022 | | |
| JP | 2002236902 A | 8/2002 | | |
| KR | 20190086303 A | 7/2019 | | |

* cited by examiner

*Primary Examiner* — S. Behrooz Ghorishi

(74) *Attorney, Agent, or Firm* — HOUTTEMAN LAW LLC

(57) ABSTRACT

The present disclosure provides a buckle assembly, a pressing and cutting jig, and a method and an apparatus for manufacturing a package structure. The buckle assembly includes a plurality of buckle structures, one plastic frame structure, and one support; an outer contour of the plastic frame structure is matched with an outer contour of a housing of an electronic product; the plastic frame structure is provided with a plurality of openings, and each buckle structure is embedded into one of the openings; the support is disposed in an annular area defined by the plastic frame structure; the support is divided into a plurality of branches each having a first end and a second end, first ends of different branches are connected, while the second end of each branch is connected to one of the buckle structures.

20 Claims, 10 Drawing Sheets

BUCKLE ASSEMBLY, PRESSING AND CUTTING JIG, AND METHOD AND APPARATUS FOR MANUFACTURING PACKAGE STRUCTURE

TECHNICAL FIELD

The present disclosure belongs to the technical field of mobile terminals, and specifically relates to a buckle assembly, a pressing and cutting jig, and a method and an apparatus for manufacturing a package structure.

BACKGROUND

With the rapid development of intelligent terminals, users have higher requirements on the aesthetic appearance of products. The current optimization methods such as paint spraying, film coating and the like on the surfaces of the products cannot satisfy the requirements of users on the appealing aesthetic appearance of products. In the current market, glass and ceramic begin to be selected as the materials for rear covers of electronic products, which, compared with plastic and metals, have thick and heavy texture and can enable better user experience. However, limited by the properties of glass and ceramic, i.e., fragility, the manufacturing of a rear cover for an electronic product is a great challenge.

SUMMARY

To solve at least one of the technical problems in the existing art, the present disclosure provides a buckle assembly, a pressing and cutting jig, and a method and an apparatus for manufacturing a package structure.

In a first aspect, a technical solution adopted to solve the technical problem of the present disclosure is a buckle assembly, including a plurality of buckle structures, one plastic frame structure, and one support; wherein an outer contour of the plastic frame structure is matched with an outer contour of a housing of an electronic product; the plastic frame structure is provided with a plurality of openings, and each buckle structure is embedded into one of the openings;

the support is disposed in an annular area defined by the plastic frame structure; the support is divided into a plurality of branches each having a first end and a second end, first ends of different branches are connected, while the second end of each branch is connected to one of the buckle structures; and the plurality of buckle structures, the plastic frame structure and the support form an integral structure by injection molding.

In some embodiments, each branch includes a branch end part at the second end, and a branch body part integrally formed with the branch end part;

the branch end part has a first surface connected to one of the buckle structures, and a second surface and a third surface which are connected to the first surface, wherein a connection position between the first surface and the second surface is opposite to a connection position between the first surface and the third surface in a first direction;

each of the buckle structures includes a buckle body part and a buckle connection part integrally formed with the buckle body part; the second end of the branch is connected to the buckle body part, and the second surface is farther away from the buckle connection part than the third surface; and a connection surface between the buckle body part and the branch forms a first dihedral angle with the second surface, wherein the first dihedral angle is smaller than 90°.

In some embodiments, the buckle body part has a first thickness in a direction toward the branch end part connected to the buckle body part; a connection position between the branch end part and the buckle body part has a second thickness in the first direction; and the second thickness is less than or equal to half of the first thickness.

In some embodiments, the branch body part includes a fourth surface connected to the second surface;

each of the buckle structures has a fifth surface connected to the branch end part, and a sixth surface and a seventh surface which are connected to the fifth surface, wherein a connection position between the fifth surface and the sixth surface is opposite to a connection position between the fifth surface and the seventh surface in the first direction; and an extension plane of the fourth surface is flush with an extension plane of the sixth surface.

In some embodiments, each of the branches has the same path length from the first end to the second end.

In some embodiments, the plastic frame structure includes a multi-segment bridge structure, wherein the multi-segment bridge structure includes two bridge end parts and a bridge body part sandwiched between the two bridge end parts;

each bridge end part has an eighth surface connected to one of the buckle structures, and a ninth surface and a tenth surface which are connected to the eighth surface, wherein a connection position between the eighth surface and the ninth surface is opposite to a connection position between the eighth surface and the tenth surface in a first direction;

each of the buckle structures includes a buckle body part and a buckle connection part integrally formed with the buckle body part; the bridge end part is connected to the buckle body part, and the ninth surface is farther away from the buckle connection part than the tenth surface; and a connection surface between the buckle body part and the bridge end part forms a third dihedral angle with the ninth surface, wherein the third dihedral angle is smaller than 90°.

In some embodiments, the bridge body part has a third thickness in the first direction; a connection position between the bridge end part and the buckle body part has a fourth thickness in the first direction; and the fourth thickness is less than or equal to half of the third thickness.

In some embodiments, the bridge body part includes an eleventh surface and a twelfth surface disposed opposite to each other in the first direction;

each of the buckle structures has a fifth surface connected to the plastic frame structure, and a sixth surface and a seventh surface which are connected to the fifth surface, wherein a connection position between the fifth surface and the sixth surface is opposite to a connection position between the fifth surface and the seventh surface in the first direction; and an extension plane of the eleventh surface is flush with an extension plane of the sixth surface.

In some embodiments, the plurality of buckle structures are centrosymmetric about a center of the plastic frame structure.

In some embodiments, the buckle assembly further includes a support which is centrosymmetric about a center of the plastic frame structure.

In a second aspect, an embodiment of the present disclosure further provides a method for manufacturing a package structure, including:

providing a buckle assembly and a housing, wherein the buckle assembly is a buckle assembly as described in any of the above embodiments; and connecting the buckle assembly with the housing, and removing the plastic frame structure and the support from the buckle assembly to form a package structure.

In some embodiments, connecting the buckle assembly with the housing and removing the plastic frame structure and the support from the buckle assembly includes:

providing a pressing and cutting jig, wherein the pressing and cutting jig includes at least a male jig core, a female jig core and a plurality of sets of cutting needles;

placing the buckle assembly into an internal cavity of the male jig core, and bonding the housing onto the buckle assembly by a bonding structure; assembling the female jig core with the male jig core, wherein the internal cavity of the male jig core has the same pattern as the buckle assembly; and pressing a structure obtained by bonding the buckle assembly and the housing with the female jig core, to enable each set of cutting needles to cut at a connection position between one of the buckle structures and the plastic frame structure, thereby forming the package structure.

In some embodiments, the buckle assembly further includes a support; and forming the package structure further includes: cutting at a connection position between each of the buckle structures and the support with the cutting needles.

In a third aspect, an embodiment of the present disclosure further provides a pressing and cutting jig, including a male jig core, a female jig core, a plurality of sets of cutting needles, a cutting needle plate, a cutting needle baffle and a guide post; wherein the cutting needle plate is disposed on the cutting needle baffle; the male jig core has a guide post through hole; the guide post is fixed on the cutting needle plate and passes through the guide post through hole to be movably connected to the male jig core; the plurality of sets of cutting needles are disposed between the cutting needle baffle and the male jig core, and each set of cutting needles passes through stepped through holes in the cutting needle plate to be fixed by the cutting needle baffle; the female jig core is positioned on a side of the male jig core away from the cutting needle plate, and detachably connected to the male jig core;

an internal cavity of the male jig core has the same pattern as the buckle assembly; and an internal cavity formed by the female jig core and the male jig core assembled with each other is used for accommodating the buckle assembly and the housing; the buckle assembly is a buckle assembly as described in any of the above embodiments; and each set of cutting needles is configured to cut at a connection position between one of the buckle structures and the plastic frame structure.

In some embodiments, the buckle assembly further includes a support; and each set of cutting needles is further configured to cut at a connection position between one of the buckle structures and the support.

In some embodiments, the pressing and cutting jig further includes a spring; wherein the spring is nested on the guide post and configured to reset the pressing of the female jig core to the male jig core.

In some embodiments, the pressing and cutting jig further includes a stopper; wherein the stopper is disposed between the cutting needle plate and the male jig core, and fixed onto a surface of the male jig core close to the cutting needle plate; and when the pressing and cutting jig is not in a working state, a first distance between a surface of the stopper close to the cutting needle plate and a surface of the cutting needle plate close to the male jig core is less than a thickness of a bridge body part, and the first distance is greater than a minimum thickness of a branch end part in a first direction, and greater than a minimum thickness of a bridge end part in the first direction.

In some embodiments, the pressing and cutting jig further includes a counter fixed onto the cutting needle plate and configured to record the number of cuts.

In a fourth aspect, an embodiment of the present disclosure further provides an apparatus for manufacturing a package structure, including a pressing and cutting jig as described in any of the above embodiments.

In some embodiments, the apparatus further includes a workbench and a manipulator;

the pressing and cutting jig is disposed on the workbench, and the manipulator is configured to assemble or separate a female jig core and a male jig core; and/or take a finished package structure out of an internal cavity of the male jig core.

Figure 1A:
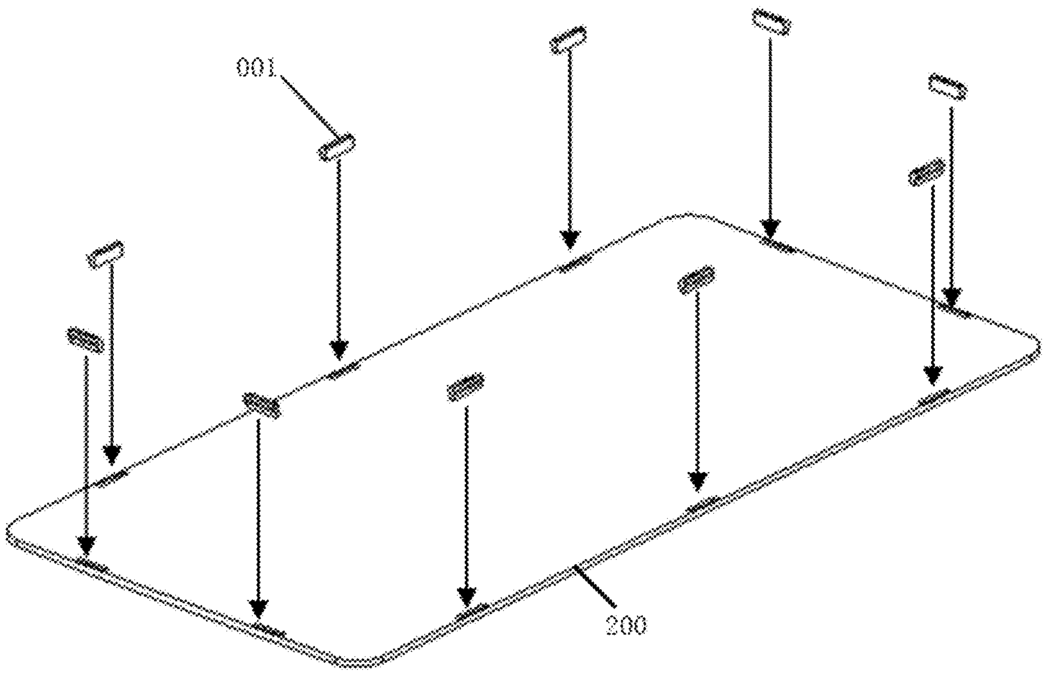
FIG. 1a (Prior Art)
FIG. 1*a* is a schematic diagram of bonding a glass sheet individually in the existing art.

Reference Signs: 000. package structure (glass rear cover or ceramic rear cover); 100. buckle assembly; 200. housing (glass sheet or ceramic sheet); 101. buckle structure; 102. plastic frame structure; 103. support; 11. buckle body part; 12. buckle connection part; 2. bridge structure; 21. bridge end part; 22. bridge body part; O. first end of a branch; 31. branch end part; 32. branch body part; 03. third surface; 05. fifth surface; 07. seventh surface; 010. tenth surface; 012. twelfth surface; α. first dihedral angle; β. second dihedral angle; γ. third dihedral angle; H1. first thickness; H2. second thickness; H3. third thickness; H4. fourth thickness; 300. pressing and cutting jig; 41. male jig core; 42. female jig core; 421. handle; 43. cutting needle; 44. cutting needle plate; 45. cutting needle baffle; 46. guide post; 47. spring; 48. stopper; 49. counter; 410-1. screw for fixing a handle; 410-2. screw for fixing a stopper; 410-3. screw for fixing a counter; 410-4. screw for locking a cutting needle plate; 410-5. screw for fixing a cutting needle baffle; 411. positioning block; 400. electronic product body; 500. workbench; 600. manipulator; and 601. suction disk.

DETAIL DESCRIPTION OF EMBODIMENTS

To make the objects, technical solutions and advantages of the embodiments of the present disclosure more apparent, the technical solutions according to the embodiments of the present disclosure will be clearly and completely described below with reference to the drawings of the embodiments of the present disclosure. Apparently, the described embodiments are merely some, but not all, of the embodiments of the present disclosure. The components of the embodiments of the present disclosure, as generally described and illustrated in the figures herein, could be arranged and designed in a wide variety of different configurations. Therefore, the following detailed description of the embodiments of the present disclosure, provided in the accompanying drawings, is not intended to limit the scope of the present disclosure as claimed, but is merely representative of selected embodiments of the present disclosure. All other embodiments, which can be derived by those skilled in the art from the embodiments of the present disclosure without making any creative effort, shall fall within the protection scope of the present disclosure.

Unless otherwise defined, technical or scientific terms used in the present disclosure are intended to have general meanings as understood by those of ordinary skill in the art to which the present disclosure belongs. The words "first", "second" and similar terms used in the present disclosure do not denote any order, quantity, or importance, but are used merely for distinguishing different components from each other. The word "comprise" or "include" or the like means that the element or item preceding the word contains elements or items that appear after the word or equivalents thereof, but does not exclude other elements or items. The words "upper", "lower", "left", "right", or the like are merely used to indicate a relative positional relationship, and when an absolute position of the described object is changed, the relative positional relationship may be changed accordingly.

Reference to "a plurality of or several" in the present disclosure means two or more. The term "and/or" describes an association relationship of associated objects, which may include three relationships; for example, A and/or B may refer to: A alone, A and B, or B alone. The character "/" generally indicates that the former and latter associated objects are in an "or" relationship.

It should be noted that the glass or ceramic rear cover can reflect light, giving people a transparent aesthetic feeling, which is not possessed by metal or plastic materials. In addition, the glass or ceramic rear cover is not likely to block electric waves, and thus is more suitable for near field communication (NFC) and wireless charging. For example, since the glass or ceramic is not likely to block electric waves, when an NFC function, for example, swiping a traffic card, swiping a door guard, payment, data transmission or the like, is used, the response can be more sensitive, thereby improving the user experience. For another example, since the glass or ceramic has little resistance to the received electric waves, an electronic product using a glass or ceramic rear cover is more suitable for wireless charging.

In the existing art, most glass or ceramic rear covers of the current electronic products on the market are manufactured by a bonding process, where the battery cannot be removed, which has the advantages of compact and thin machine body, and good waterproof performance. However, the disadvantages are also obvious. For example, since the battery is not removable, the electronic product has to be replaced by a new one when the lifetime of the battery carried therein expires, thereby shortening the product replacement period. In addition, once the electronic product with the non-detachable rear cover has problems, the user has to seek help from a professional person, and cannot disassemble the electronic product by himself/herself.

Figure 1B:
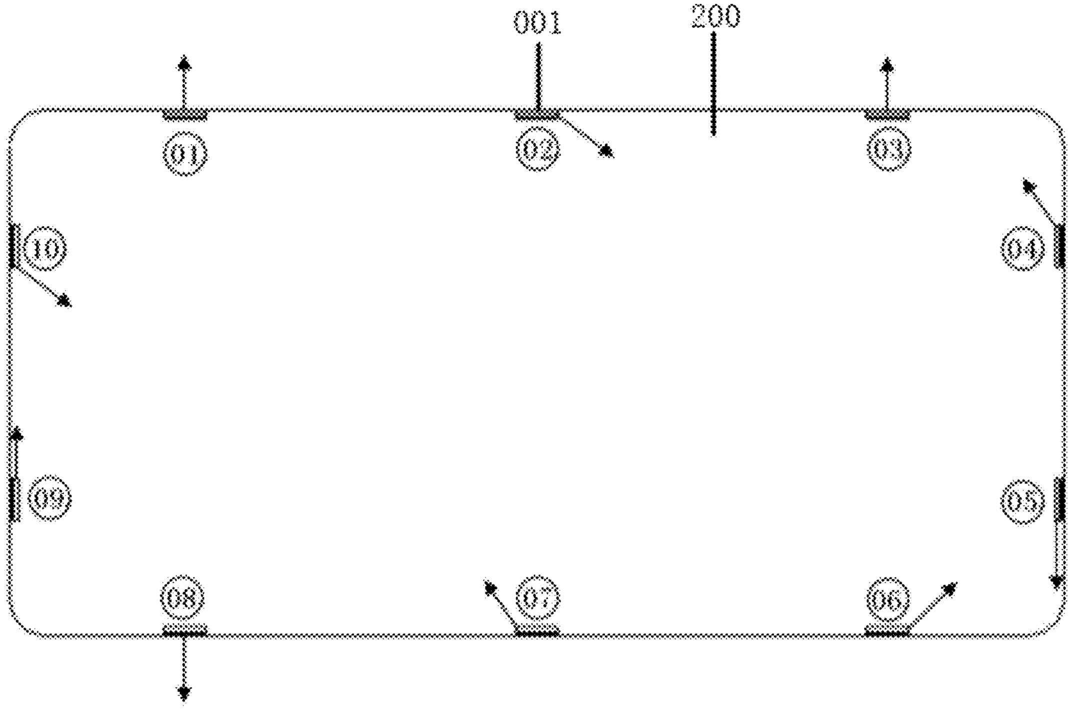
FIG. 1b (Prior Art)
FIG. 1*b* is a schematic diagram of possible deviation directions of a bonded glass sheet in the existing art.

A main composition of glass or ceramic is silicon dioxide, which is an amorphous material having a molecular structure typically lacking stability. In simple terms, the silicon dioxide material is fragile. While the glass or ceramic rear cover is manufactured by a bonding process, bonding is relatively difficult limited by the fragility of the material. FIG. 1*a* is a schematic diagram of bonding a glass sheet individually in the existing art. As shown in FIG. 1*a*, a plurality of individual buckles 001 are prepared, and then each buckle 001 is separately bonded to a glass sheet 200. FIG. 1*b* is a schematic diagram of possible deviation directions of a bonded glass sheet in the existing art. As shown in FIG. 1*b*, buckles 001 with serial number 01 to 10 are bonded to a glass rear cover in total. Since the buckles 001 are individually installed, it is hard to guarantee relatively accurate positions of the buckles 001, resulting in deviations of the buckles 001 in various directions as shown in FIG. 1*b*. Any skew or misplaced buckle 001 will make the glass rear cover unable to be installed. Even a slight deviation in the position of a buckle 001 will cause skew and non-uniform stress after installation, causing falling of the buckle 001 and even breakage of the glass sheet 200, and thus seriously influencing the product yield. Even if the installed product is in good condition, the product yield will be seriously influenced, leaving hidden dangers in use for subsequent users and bringing continuous after-sale repairs.

In view of this, an embodiment of the present disclosure provides a buckle assembly configured to manufacture a package structure of an electronic product, so that the package structure has buckle structures in the buckle assembly, and the package structure of the electronic product is detachable.

Figure 2:
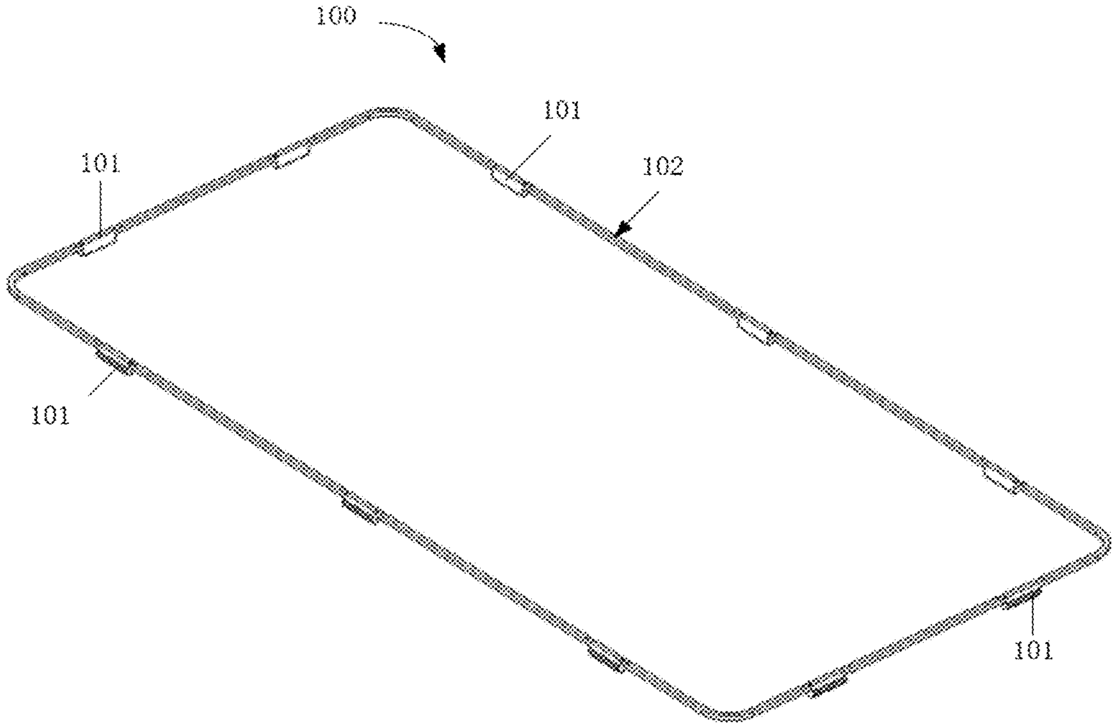
FIG. 2 is a schematic structural diagram of a buckle assembly according to an embodiment of the present disclosure.

The following provides a detailed description of a specific structure of a buckle assembly according to an embodiment of the present disclosure. FIG. 2 is a schematic structural diagram of a buckle assembly according to an embodiment of the present disclosure. As shown in FIG. 2, a buckle assembly 100 includes a plurality of buckle structures 101 and a plastic frame structure 102. An outer contour of the plastic frame structure 102 is matched with an outer contour of a housing 200 of an electronic product. The plastic frame structure 102 is provided with a plurality of openings, and each buckle structure 101 is embedded into one of the openings. The plurality of buckle structures 101 and the plastic frame structure 102 form an integral structure by injection molding.

The outer contour of the housing 200 is matched with the outer contour of the plastic frame structure 102, so that the buckle structures 101 embedded into the plastic frame structure 102 are also matched with the outer contour of the housing 200. Meanwhile, the plurality of buckle structures 101 and the plastic frame structure 102 form an integral structure by injection molding, so that relative positions of the buckle structures 101 are relatively accurate, and position deviation of the buckle structures 101 when aligned with the housing 200 is avoided. In addition, the plurality of buckle structures 101 and the plastic frame structure 102 form an integral structure by injection molding, so that in the manufacturing process, this integral structure is connected to the housing 200 to prevent a concentrated stress on the housing 200 when the buckle structures 101 are installed individually. In other words, the buckle assembly 101 in the embodiment of the present disclosure is formed as an integral structure by injection molding, and the plurality of buckle structures 101 are installed with the housing 200 at the same time to disperse a stress on the housing 200, so that the risk of breakage of a local portion of the housing 200 due to pressure during the dwell process is reduced, the quality of the package structure 000 is guaranteed, and the yield of the electronic product is improved.

The buckle structure 101 in the embodiment of the present disclosure is a structure capable of cooperating with another part to implement integral locking, and the buckle structure 101 is typically made of a plastic material with certain flexibility. Apparently, the material of the buckle structure 101 in the embodiment of the present disclosure is not limited to plastic, and may be any other material with certain flexibility. The buckle structure 101 may be cooperated with a body of the electronic product to implement locking.

The number of buckle structures 101 is the same as the number of openings in the plastic frame structure 102. The plurality of buckle structures 101 and the plastic frame structure 102 form an integral structure by injection molding, where the integral structure formed by injection molding is a closed frame structure, wherein the frame structure is relatively stable, and the buckle assembly 100 has an accurate relative position on the frame structure, so as to facilitate subsequent assembling with the glass sheet 200 (or ceramic sheet 200) and implement accurate alignment.

Here, the housing of the electronic product may be understood as a housing of a package structure of the electronic product. The housing may be made of a material including, but not limited to, a relatively thin and fragile material such as glass, ceramic, or the like. Exemplarily, the housing 200 of the electronic product may be selected as a glass sheet or ceramic sheet that is aesthetically pleasing and not likely to block electric waves, which may be specifically a glass sheet or a ceramic sheet on a rear cover of a mobile phone.

The present disclosure will be described by taking the housing 200 being a glass sheet as an example. Bonding is relatively difficult limited by the fragility of the glass. In view of this, the present disclosure provides a buckle assembly 100, which includes a combination of any one or more of the following embodiments with the buckle assembly 100 described above, so as to assist the assembly between the buckle structures 101 and the glass sheet 200, and implement accurate positioning, while reducing the risk of breakage of a local portion of the glass sheet 200 due to pressure during the dwell process, ensuring the quality of the resulting package structure 000, and improving the yield of the electronic product.

Figure 3:
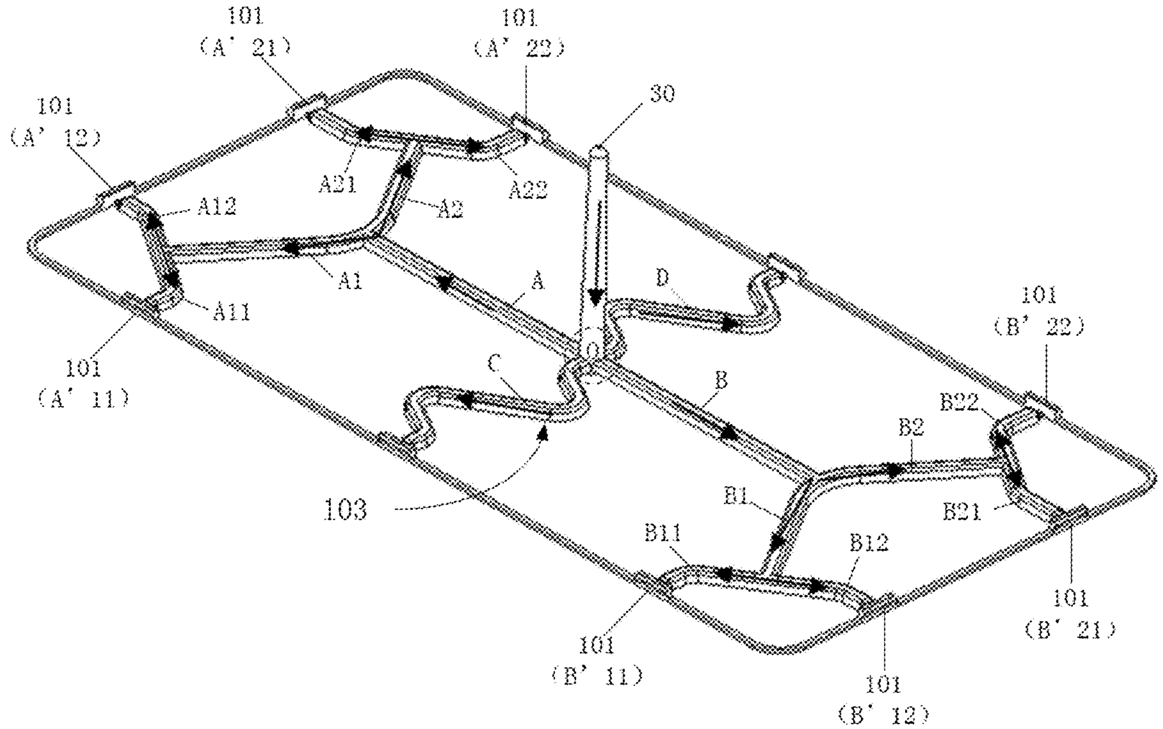
FIG. 3 is a schematic structural diagram of another buckle assembly according to an embodiment of the present disclosure.

In some embodiments, FIG. 3 is a schematic structural diagram of another buckle assembly according to an embodiment of the present disclosure. As shown in FIG. 3, a buckle assembly 100 includes a plurality of buckle structures 101, one plastic frame structure 102, and one support 103. An outer contour of the plastic frame structure 102 is matched with an outer contour of a housing 200 of an electronic product. The plastic frame structure 102 is provided with a plurality of openings, and each buckle structure 101 is embedded into one of the openings. The support 103 is disposed in an annular area defined by the plastic frame structure 102. The buckle assembly 100 further includes the support 103 in an annular region enclosed by the plastic frame structure 102. The support 103 is divided into a plurality of branches each having a first end and a second end. First ends O of different branches are connected, while the second end of each branch is connected to one of the buckle structures 101. The plurality of buckle structures 101, the one plastic frame structure 102, and the one support 103 form an integral structure by injection molding. Therefore, while relative positions of the buckle structures 101 are relatively accurate, and position deviation of the buckle structures 101 when aligned with the housing 200 is avoided, the overall strength of the buckle assembly 100 can be increased, deformation of the buckle structures 101 can be effectively alleviated, the risk of breakage of a local portion of the housing 200 due to pressure during the dwell process is reduced, and thus the yield of the buckle structures 101 assembled with the glass sheet 200 is increased.

The support 103 is a molded structure of an injection molding raw material in branch channels of the mold during the injection molding process of the buckle structures 101. As shown in FIG. 3, reference 30 indicates a molded structure of an injection molding raw material in a main channel of the mold during the injection molding process of the buckle structures 101. The injection molding raw material flows into the branch channels from the main channel and then into a gate, to form an integral structure of the plurality of buckle structures 101, the plastic frame structure 102 and the support 103, i.e., the buckle assembly 100, by injection molding.

Exemplarily, at least some of the plurality of branches share at least some structures. As shown in FIG. 3, the support 103 includes a structure A, a structure A1, a structure A2, a structure A11, a structure A12, a structure A21, a structure A22, a structure B, a structure B1, a structure B2, a structure B11, a structure B12, a structure B21, a structure B22, a structure C, and a structure D. The structure A, the structure B, the structure C and the structure D are connected at one end (i.e., point O). The other end of the structure A connects the structure A1 and the structure A2, the structure A1 connects the structure A11 and the structure A12, and the structure A2 connects the structure A21 and the structure A22. The other end of the structure B connects the structure B1 and the structure B2, the structure B1 connects the structure B11 and the structure B12, and the structure B2 connects the structure B21 and the structure B22. A branch of the support 103 connecting the buckle structures 101 (A'11) includes the structure A, the structure A1, and the structure A11, and a branch connecting the buckle structures 101 (A'12) includes the structure A, the structure A1, and the structure A12, where the two branches share the structure A and the structure A1. A branch of the support 103 connecting the buckle structures 101 (A'21) includes the structure A, the structure A2, and the structure A21, and a branch connecting the buckle structures 101 (A'22) includes the structure A, the structure A2, and the structure A22, where the two branches share the structure A and the structure A2. The branch of the support 103 connecting the buckle structures 101 (A'11) and the branch connecting the buckle structures 101 (A'12) share the structure A with the branch of the support 103 connecting the buckle structures 101 (A'21) and the branch connecting the buckle structures 101 (A'22). A branch of the support 103 connecting the buckle structures 101 (B'11) includes the structure B, the structure B1, and the structure B11, and a branch connecting the buckle structures 101 (B'12) includes the structure B, the structure B1, and the structure B12, where the two branches share the structure B and the structure B1. A branch of the support 103 connecting the buckle structures 101 (B'21) includes the structure B, the structure B2, and the structure B21, and a branch connecting the buckle structures 101 (B'22) includes the structure B, the structure B2, and the structure B22, where the two branches share the structure B and the structure B2. The branch of the support 103 connecting the buckle structures 101 (B'11) and the branch connecting the buckle structures 101 (B'12) share the structure B with the branch of the support 103 connecting the buckle structures 101 (B'21) and the branch connecting the buckle structures 101 (B'22). Compared with independent branches connecting the buckle structures 101, the above structural design of the support 103 can reduce the material consumption and save the cost, while reducing the injection molding time of the buckle assembly 100 and improving the efficiency of the injection molding.

Figure 4:
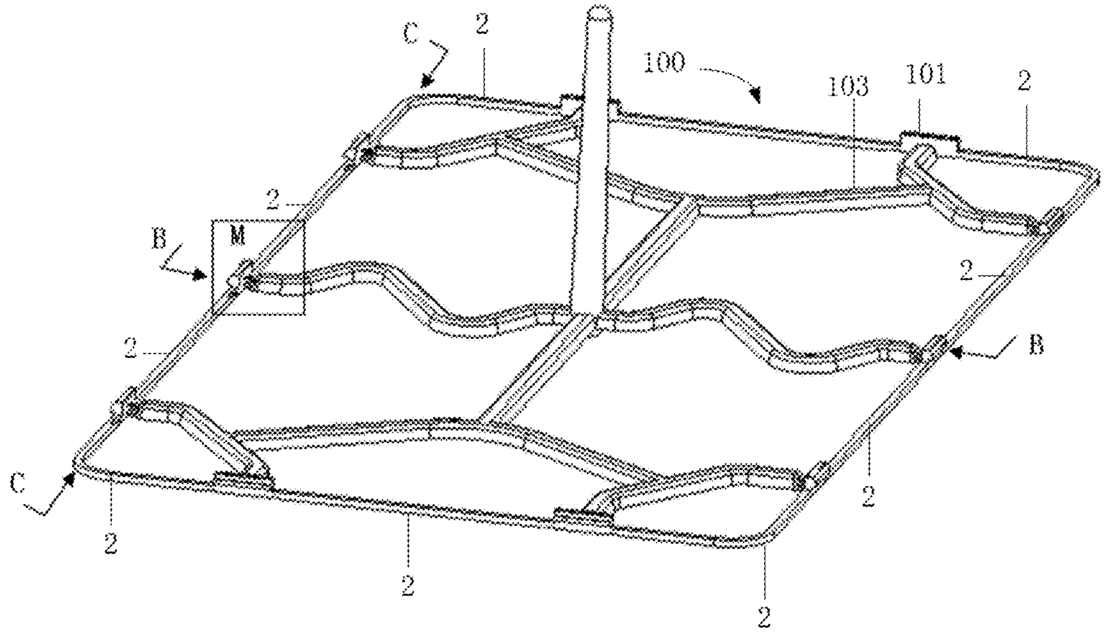
FIG. 4 is a schematic diagram of an exemplary buckle assembly according to an embodiment of the present disclosure.
Figure 5:
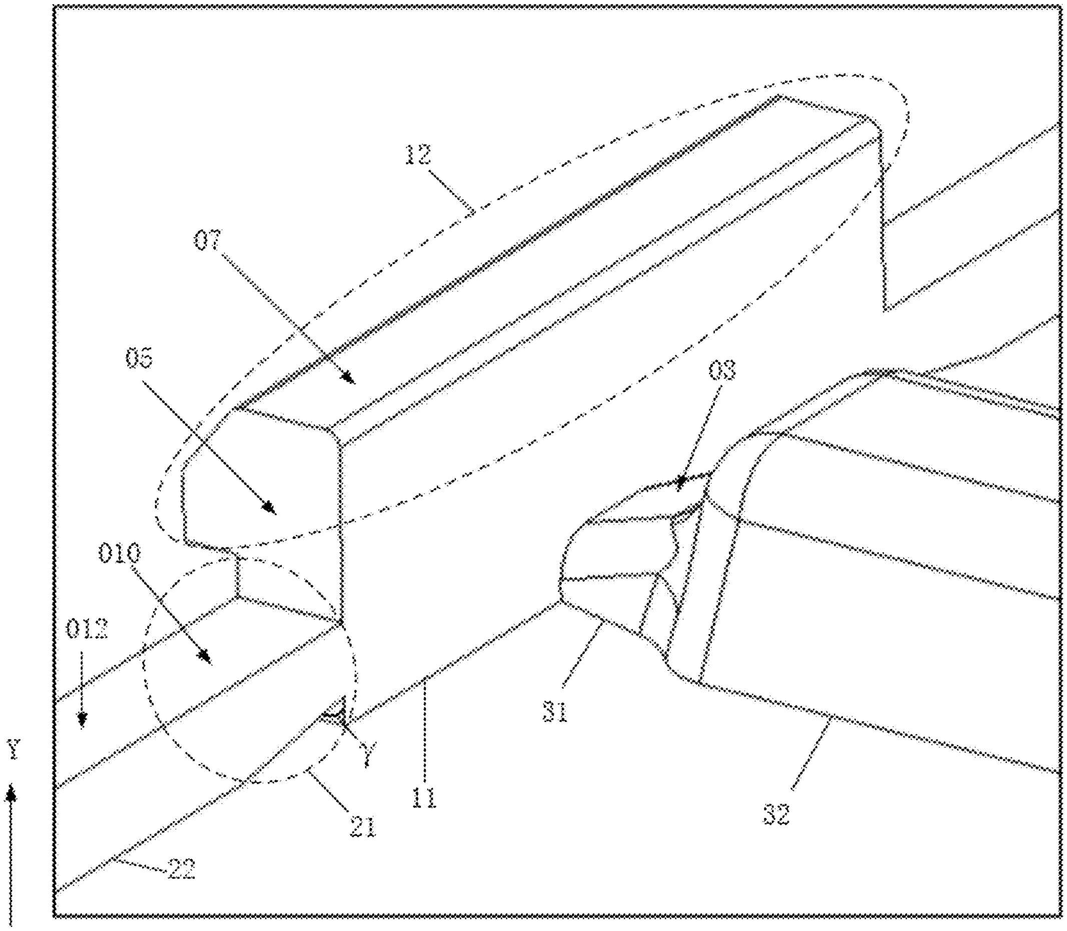
FIG. 5 is a partial enlarged view of at position M of FIG. 4.
Figure 6:
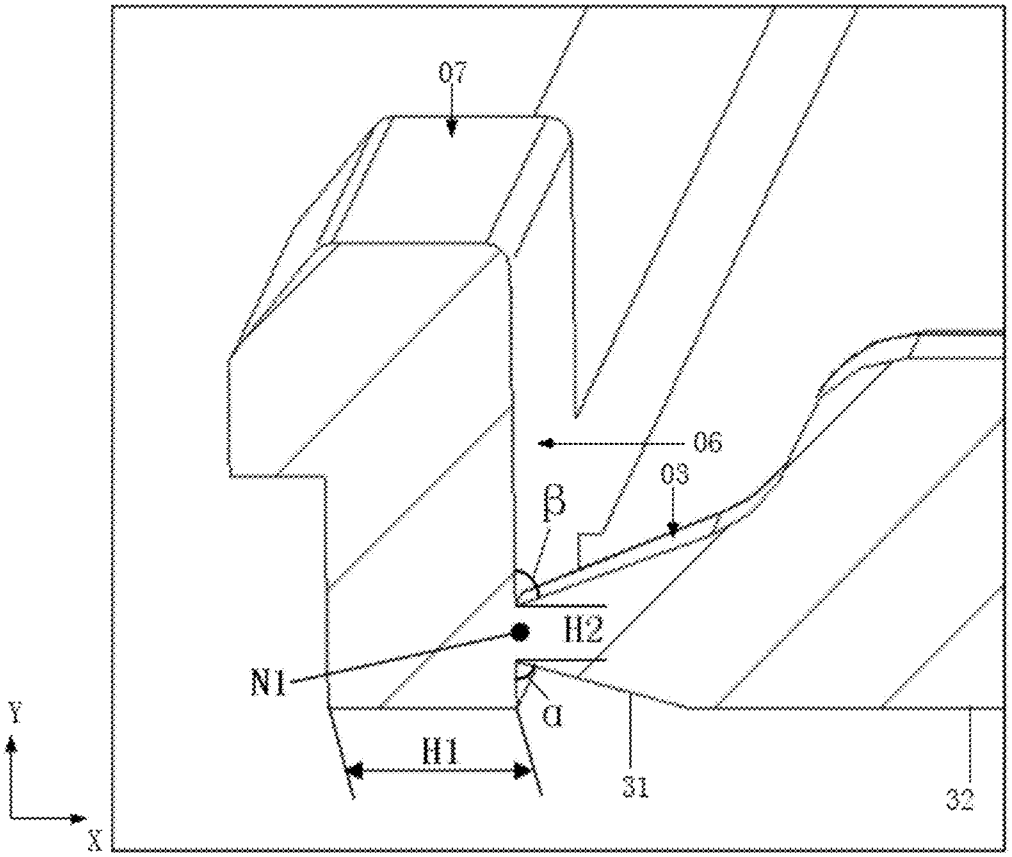
FIG. 6 is a sectional view taken along line B-B of FIG. 4.

FIG. 4 is a schematic diagram of an exemplary buckle assembly according to an embodiment of the present disclosure, FIG. 5 is a partial enlarged view of at position M of FIG. 4, and FIG. 6 is a sectional view taken along line B-B of FIG. 4.

In some embodiments, as shown in FIGS. 4, 5 and 6, each branch includes a branch end part 31 at the second end, and a branch body part 32 integrally formed with the branch end part 31. The branch end part 31 has a first surface connected to one of the buckle structures 101, and a second surface and a third surface 03 which are connected to the first surface. A connection position between the first surface and the second surface is opposite to a connection position between the first surface and the third surface 03 in a first direction Y. Here, the first direction Y may be understood as a thickness direction of the buckle assembly 100. Each of the buckle structures 101 includes a buckle body part 11 and a buckle connection part 12 integrally formed with the buckle body part. The second end of the branch is connected to the buckle body part 11. The second surface is farther away from the buckle connection part 12 than the third surface 03. A connection surface between the buckle body part 11 and the branch forms a first dihedral angle $\alpha$ with the second surface, where the first dihedral angle $\alpha$ is smaller than 90°.

It should be noted that for the process of assembling the buckle assembly 100 with the glass sheet 200 to form the package structure 000, the support 103 and the plastic frame structure 102 are cut out from the buckle assembly 100, while only the buckle structures 101 are reserved and connected to the glass sheet 200. In this embodiment, however, by forming the first dihedral angle $\alpha$, so that a certain gap is formed between the connection position between the branch end part 31 and the buckle body part 11 and the sixth surface of the buckle body part 11. The sixth surface is a surface to be connected to the glass sheet 200. As a result, by providing the gap, the influence of cutting needles 43 on the glass sheet 200 in the subsequent cutting process can be avoided, and the risk of damaging the glass sheet 200 by the cutting needles 43 is reduced.

Further, in combination with the above embodiments, as shown in FIG. 6, the connection surface between the buckle body part 11 and the branch forms a second dihedral angle $\beta$ with the third surface 03, where the second dihedral angle $\beta$ is smaller than 90°.

Here, by forming the second dihedral angle $\beta$, the branch end part 31 is substantially thinned, especially that a thickness at the second end of the branch is substantially reduced compared with a thickness of the branch body part 32, so that the connection position between the branch end part 31 and the buckle body part 11 is at a weak point N1, which facilitates the subsequent cutting. In addition, the branch end part 31 in this embodiment has a wedge-shaped structure. A thickness of the branch end part 31 gradually decreases in a direction approaching the buckle body part 11 connected to the branch end part 31, which ensures the strength at the connection position between the branch end part 31 and the branch body part 32, while satisfying the requirement of easy breaking of the connection position between the branch end part 31 and the buckle body part 11.

In some embodiments, as shown in FIG. 6, the buckle body part 11 has a first thickness H1 in a direction X toward the branch end part 31 connected to the buckle body part 11. A connection position between the branch end part 31 and the buckle body part 11 has a second thickness H2 in the first direction Y. The second thickness H2 is less than or equal to half of the first thickness H1. Such a structure satisfies the condition of easy breaking at the weak point N1.

In some embodiments, as shown in FIGS. 5 and 6, each branch includes a branch end part 31 at the second end, and a branch body part 32 integrally formed with the branch end part 31. The branch body part 32 includes a fourth surface connected to the second surface. Each of the buckle structures 101 has a fifth surface 05 connected to the branch end part 31, and a sixth surface and a seventh surface 07 which are connected to the fifth surface 05. A connection position between the fifth surface 05 and the sixth surface is opposite to a connection position between the fifth surface 05 and the seventh surface 07 in the first direction Y. An extension plane of the fourth surface is flush with an extension plane of the sixth surface.

This embodiment is combined with any one or more of the above embodiments, and the extension plane of the fourth surface is flush with the extension plane of the sixth surface, so that the overall strength of the buckle assembly 100 can be increased, and in the following press-fit process, an overall supporting effect of the glass sheet 200 by the buckle assembly 100 is improved, and the stress on the glass sheet 200 is further dispersed. Therefore, the risk of breakage of a local portion of the glass sheet 200 due to pressure during the dwell process is reduced, the quality of the package structure 000 is guaranteed, and the yield of the electronic product is improved.

In some embodiments, each branch is in a special-shaped structure, and has the same path length from the first end O to the second end. As shown in FIG. 3, a sum of path lengths of the structure A, the structure A1 and the structure A11, a sum of path lengths of the structure A, the structure A1 and the structure A12, a sum of path lengths of the structure B, the structure B1 and the structure B11, a sum of path lengths of the structure B, the structure B1 and the structure B12, a path length of the structure C, and a path length of the structure D, are the same. In other words, each branch channel has the same path length in the injection molding process, so that a flow rate of the injection molding raw material can be controlled to make sure that various gates are fed and fully filled at the same time, and simultaneously cooled and molded, thereby ensuring the consistency of the buckle structures 101, and increasing the efficiency of injection molding.

In addition, in combination with the above embodiments, in the support 103, the design of at least some of the plurality of branches sharing at least some structures can facilitate the arrangement of branches with the same path length. Meanwhile, the material consumption is reduced, the cost is saved, and the efficiency of the injection molding is improved.

Figure 7:
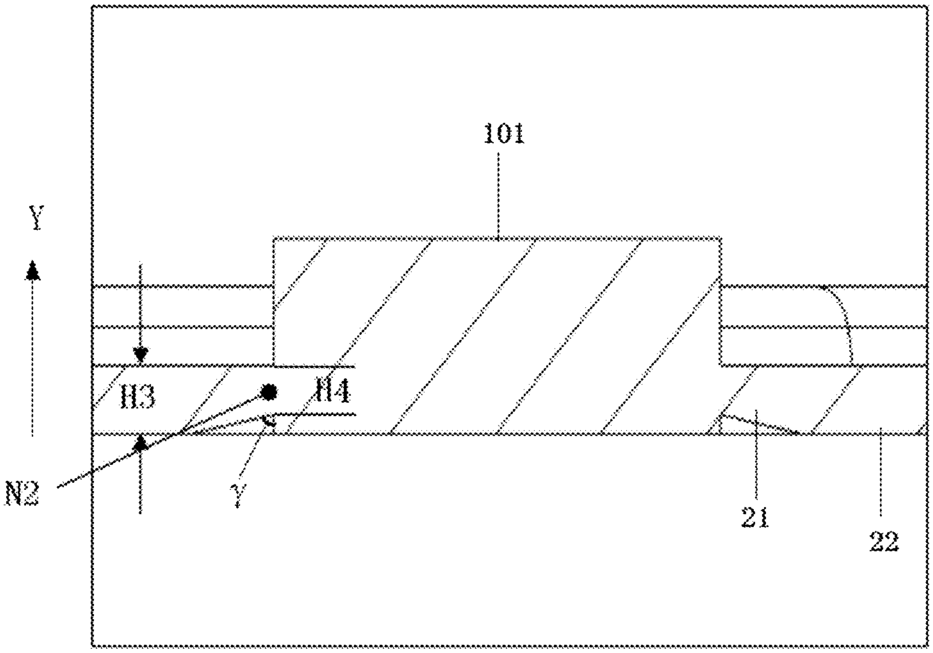
FIG. 7 is a sectional view taken along line C-C of FIG. 4.

In some embodiments, FIG. 7 is a sectional view taken along line C-C of FIG. 4. As shown in FIGS. 4, 5 and 7, the plastic frame structure 102 includes a multi-segment bridge structure 2. The bridge structure 2 includes two bridge end parts 21 and a bridge body part 22 sandwiched between the two bridge end parts 21. Each bridge end part 21 has an eighth surface connected to one of the buckle structures 101, and a ninth surface and a tenth surface 010 which are connected to the eighth surface. A connection position between the eighth surface and the ninth surface is opposite to a connection position between the eighth surface and the tenth surface 010 in a first direction Y. Each of the buckle structures 101 includes a buckle body part 11 and a buckle connection part 12 integrally formed with the buckle body part. The bridge end part 21 is connected to the buckle body part 11. The ninth surface is farther away from the buckle connection part 12 than the tenth surface 010. A connection surface between the buckle body part 11 and the bridge end part 21 forms a third dihedral angle γ with the ninth surface, where the third dihedral angle γ is smaller than 90°.

It should be noted that for the process of assembling the buckle assembly 100 with the glass sheet 200 to form the package structure 000, the support 103 and the plastic frame structure 102 are cut out from the buckle assembly 100, while only the buckle structures 101 are reserved and connected to the glass sheet 200. In this embodiment, however, by forming the third dihedral angle γ, a certain gap is formed between the connection position between the bridge end part 21 and the buckle body part 11 and the sixth surface of the buckle body part 11. The sixth surface is a surface to be connected to the glass sheet 200. As a result, by providing the gap, the influence of cutting needles 43 on the glass sheet 200 in the subsequent cutting process can be avoided, and the risk of damaging the glass sheet 200 by the cutting needles 43 is reduced.

Further, the bridge body part 22 has a thickness smaller than the buckle body part 11, and the connection position between the bridge end part 21 and the buckle body part 11 has a thickness smaller than the bridge body part 22, so that the connection position between the bridge end part 21 and the buckle body part 11 is at a weak point N2, which facilitates the subsequent cutting.

In addition, in this embodiment, the plastic frame structure 102 includes a multi-segment bridge structure 2. The multi-segment bridge structure 2 connects all the buckle structures 101 into a whole, so that the relative positions of all buckle structures 101 are ensured to be unchanged. Meanwhile, the bridge structure 2 can also effectively prevent deformation or displacement of the buckle structures 101 during injection molding due to an excessive pressure of the injection machine for jetting the injection molding raw material.

In some embodiments, as shown in FIG. 5, the bridge body part 22 includes an eleventh surface and a twelfth surface 012 disposed opposite to each other in the first direction Y. The twelfth surface 012 of the bridge body part 22 is flush with the tenth surface 010 of the bridge end part 21, to ensure the connection strength between the bridge structure 2 and the buckle structures 101.

Further, as shown in FIG. 7, the bridge body part 22 has a third thickness H3 in the first direction Y. A connection position between the bridge end part 21 and the buckle body part 11 has a fourth thickness H4 in the first direction Y. The fourth thickness H4 is less than or equal to half of the third thickness H3. Such a structure satisfies the condition of easy breaking at the weak point N2.

In combination with the above embodiments, the provision of the bridge structure 2 ensures the connection strength with the buckle structures 101, and facilitates subsequent cutting of the bridge structure 2.

In some embodiments, as shown in FIGS. 5 and 7, the bridge body part 22 includes an eleventh surface and a twelfth surface 012 disposed opposite to each other in the first direction Y. Each of the buckle structures 101 has a fifth surface 05 connected to the plastic frame structure 102, and a sixth surface and a seventh surface 07 which are connected to the fifth surface 05. A connection position between the fifth surface 05 and the sixth surface is opposite to a connection position between the fifth surface 05 and the seventh surface 07 in the first direction Y. An extension plane of the eleventh surface is flush with an extension plane of the sixth surface.

This embodiment is combined with any one or more of the above embodiments, and the extension plane of the eleventh surface is flush with the extension plane of the sixth surface, so that the overall strength of the buckle assembly 100 can be increased, and in the following press-fit process, an overall supporting effect of the glass sheet 200 by the buckle assembly 100 is improved, and the stress on the glass sheet 200 is further dispersed. Therefore, the risk of breakage of a local portion of the glass sheet 200 due to pressure during the dwell process is reduced, the quality of the package structure 000 is guaranteed, and the yield of the electronic product is improved.

In some embodiments, as shown in FIG. 2, the plurality of buckle structures 101 are centrosymmetric about a center of the plastic frame structure 102, which ensures uniform distribution of the resulting buckle structures 101 over the package structure 000, and ensures the sealing performance of the package. Meanwhile, the plurality of buckle structures 101 centrosymmetric about a center of the plastic frame structure 102 also ensure the overall strength of the buckle assembly 100.

In some embodiments, as shown in FIG. 2, the buckle assembly 100 further includes a support 103. The support 103 is centrosymmetric about a center of the plastic frame structure 102, so that the overall strength of the buckle assembly 100 can be further increased, deformation of the buckle structures 101 can be effectively alleviated, and thus the yield of the subsequent buckle structures 101 assembled with the glass sheet 200 is increased.

The above is a complete description of the structure of the buckle assembly 100 provided in the embodiments of the present disclosure.

In addition, the buckle assembly 100 may be formed by an injection molding process. The specifically process may include, for example, adding an injection molding raw material into a hopper of an injection machine, heating and melting the raw material to a flowing state, pushing the material flow, by a screw or piston of the injection machine, into a prepared specific mold cavity (including a main channel, branch channels, forming cavities for the buckle structures 101, and a forming cavity for the plastic frame structure 102) through a nozzle and a pouring system of the mold, and curing and shaping the material in the specific mold cavity, so as to form the buckle assembly 100.

Here, after being put into the injection machine, the raw material may be melted into a molten state by a heating device in the injection machine, for example, by electric heating or heating with a heating oil.

An embodiment of the present disclosure further provides a method for manufacturing a package structure 000, including the following steps S11 to S12.

At S11, providing a buckle assembly 100 and a housing 200.

The buckle assembly 100 may be a buckle assembly 100 as described in any of the above embodiments. For the specific structures in the buckle assembly 100, reference may be made to the above detailed description of the structures in the buckle assembly 100 in the foregoing embodiments, and thus are not repeated in the embodiments of the method for manufacturing the package structure 000. The housing 200 may be understood as a housing of a package structure 000 of the electronic product. Exemplarily, the housing 200 may be a glass sheet 200 as a rear cover for an electronic product.

At S12, connecting the buckle assembly 100 with the housing 200, and removing the plastic frame structure 102 and the support 103 from the buckle assembly 100 to form a package structure 000.

Here, the buckle assembly 100 and the glass sheet 200 may be connected by an adhesive. The bonded structure may be cut manually to remove the plastic frame structure 102 and the support 103 from the buckle assembly 100, so as to form the package structure 000. Alternatively, the bonded structure may be cut by a specific device to remove the plastic frame structure 102 and the support 103 from the buckle assembly 100 at the same time, thereby improving the manufacturing efficiency of the package structure 000.

In some embodiments, in step S12, a pre-prepared pressing and cutting jig 300 may be used to cut the bonded structure, which specifically includes the following steps S121 to S123.

At S121, providing a pressing and cutting jig 300.

The pressing and cutting jig 300 provided in the embodiment of the present disclosure is a jig dedicated for cutting the buckle assembly 100. The pressing and cutting jig 300 includes at least a male jig core 41, a female jig core 42 and a plurality of sets of cutting needles 43. An outer contour of an internal cavity of the male jig core 41 is matched with an outer contour of the buckle assembly 100. The internal cavity of the male jig core 41 is completely obtained by profiling the buckle assembly 100, and is used for accommodating the buckle assembly 100.

Figure 8A:
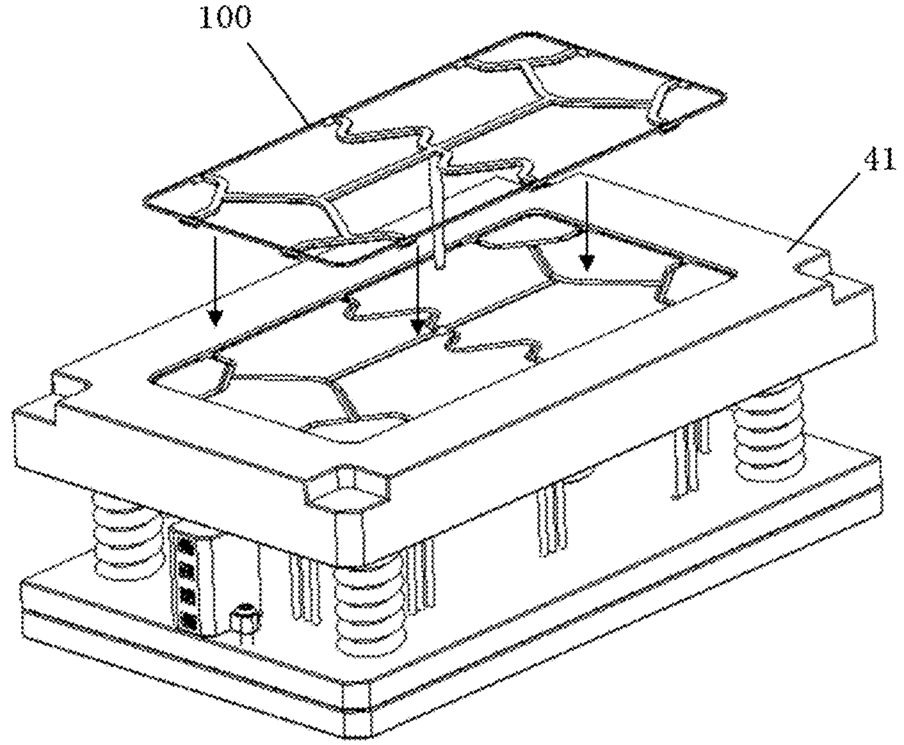
FIGS. 8*a* to 8*d* are flowcharts of a manufacturing process using a pressing and cutting jig according to an embodiment of the present disclosure.
Figure 8B:
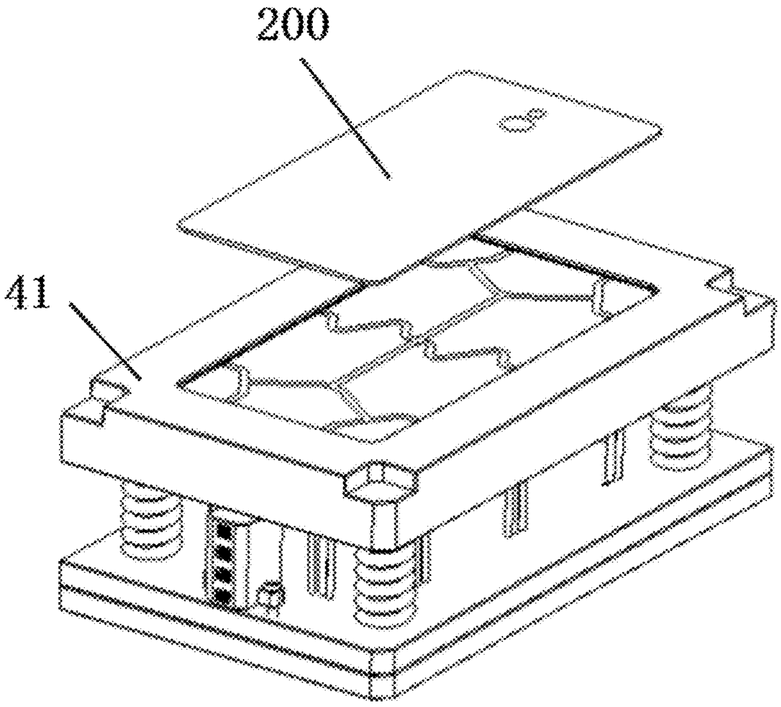
Figure 8C:
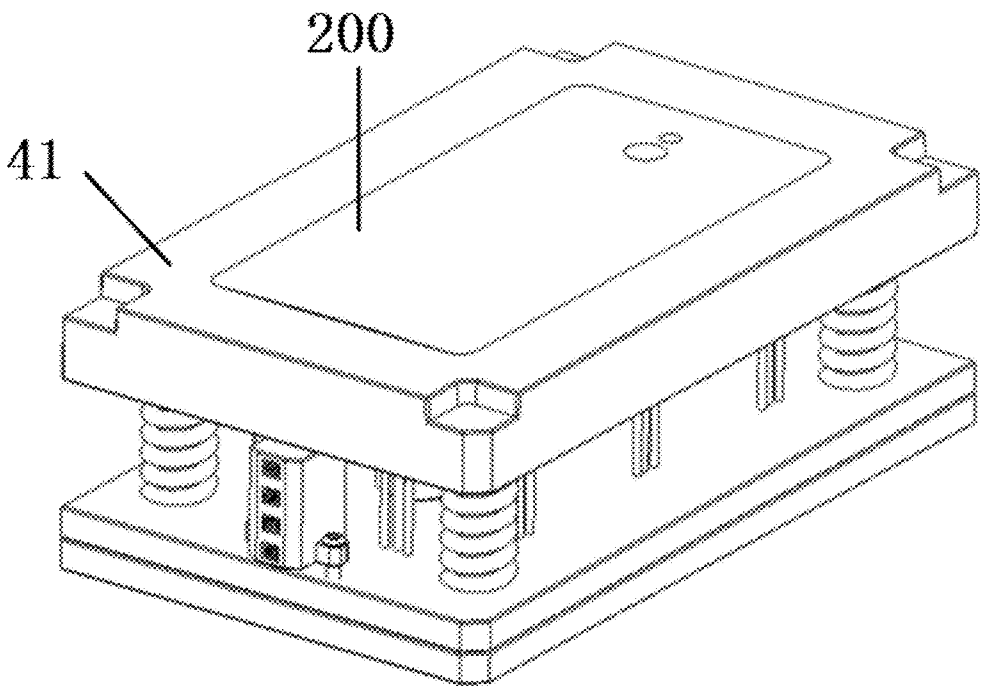

FIGS. 8*a* to 8*d* are flowcharts of a manufacturing process using a pressing and cutting jig according to an embodiment of the present disclosure. As shown in FIG. 8*a*, the internal cavity of the male jig core 41 has the same pattern as the buckle assembly 100. In order to avoid damaging the buckle connection part 12 of the buckle structure 101, a length of the cavity at a position of the internal cavity pattern of the male jig core 41 corresponding to the buckle structure 101 is slightly greater than a length at a position corresponding to the buckle connection part 12.

At S122, placing the buckle assembly 100 into an internal cavity of the male jig core 41, and bonding the housing 200 onto the buckle assembly 100 by a bonding structure; and assembling the female jig core 42 with the male jig core 41. The internal cavity of the male jig core 41 has the same pattern as the buckle assembly 100.

Specifically, as shown in FIGS. 8*a* to 8*d*, the buckle assembly 100 is placed into the internal cavity of the male jig core 41. After fitting, a bonding structure is formed on the buckle structure 101, which may specifically include coating a bonding material on the sixth surface of the buckle body part 11. Then, the glass sheet 200 is placed into the internal cavity of the male jig core 41 and attached to the buckle assembly 100, thereby bonding the buckle assembly 100 to the glass sheet 200. Then, the female jig core 42 is assembled with the male jig core 41 to perform bonding and dwell process. Here, the bonding and dwell process may be understood as that the buckle assembly 100 is bonded to the glass sheet 200 with a certain pressure maintained for a certain time period. Here, the female jig core 42 is matched with the male jig core 41 to implement detachable connection.

At S123, pressing a structure obtained by bonding the buckle assembly 100 and the glass sheet 200 by using the female jig core 42, to enable each set of cutting needles 43 to cut at a connection position between one of the buckle structures 101 and the plastic frame structure 102, thereby forming the package structure 000.

Figure 8D:
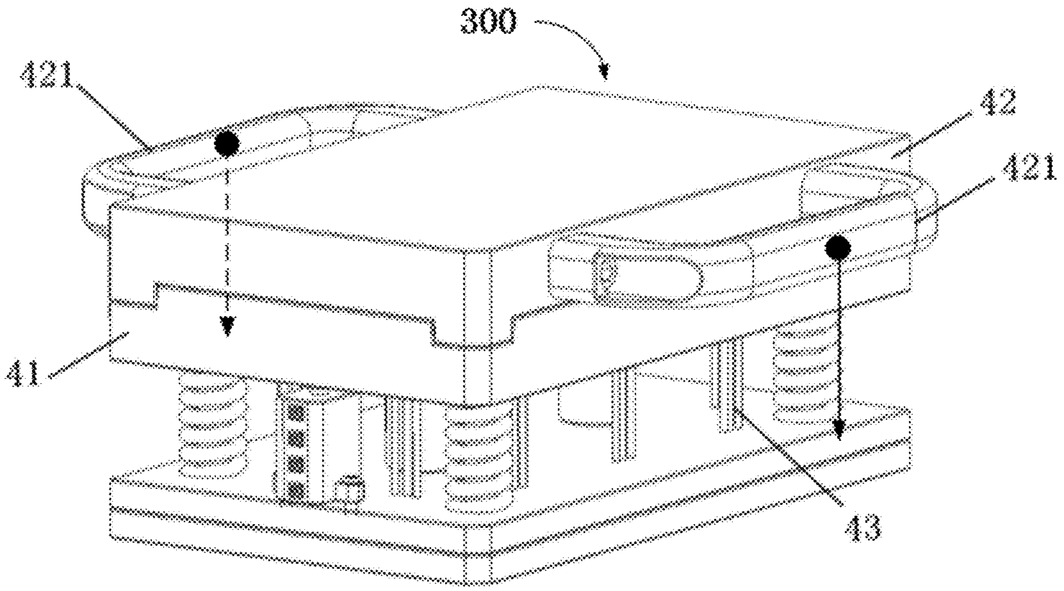
Figure 9A:
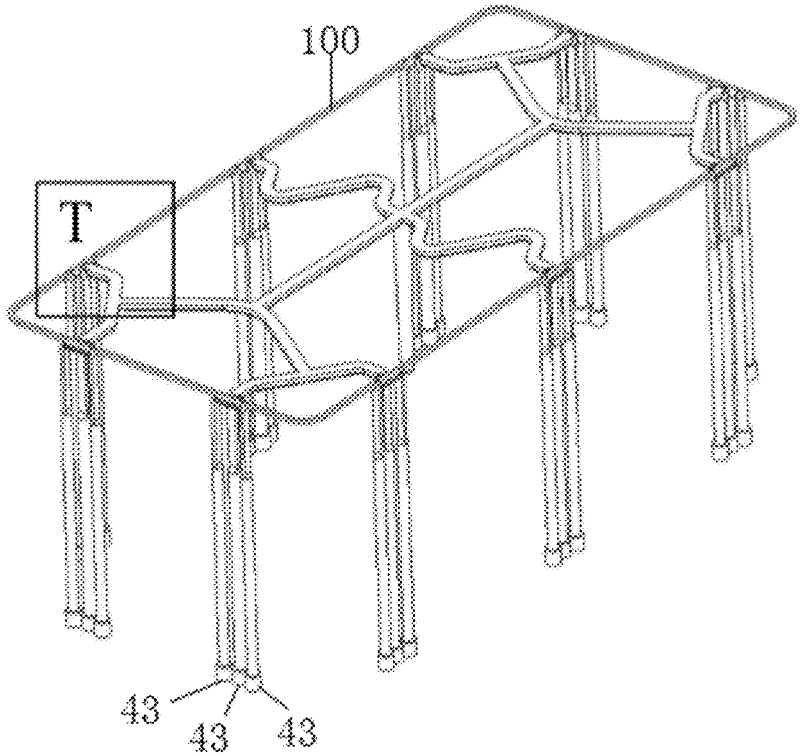
FIG. 9*a* is a schematic diagram of cutting needles cutting a buckle assembly according to an embodiment of the present disclosure.
Figure 9B:
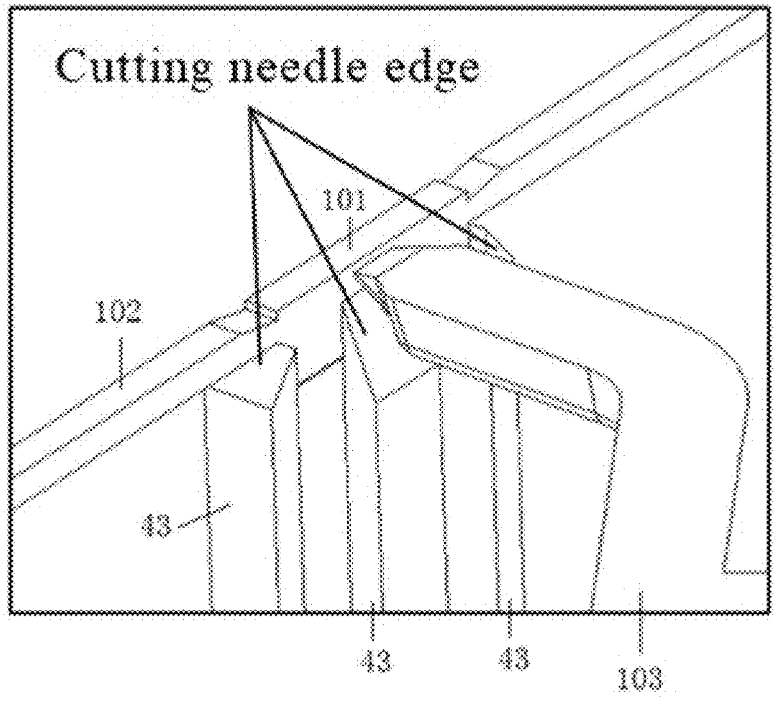
FIG. 9*b* is a partial enlarged view at position T of FIG. 9*a*.

Specifically, FIG. 9*a* is a schematic diagram of cutting needles cutting a buckle assembly according to an embodiment of the present disclosure, and FIG. 9*b* is a partial enlarged view at position T of FIG. 9*a*. As shown in FIGS. 8*d*, 9*a* and 9*b*, a handle 421 on the female jig core 42 is automatically pressed by a mechanical arm or manually pressed, and cutting needles 43 are used to cut the plastic frame structure 102. Exemplarily, one set of cutting needles 43 are used to cut two bridge structures 2 connected to the buckle structure 101. One set of cutting needles 43 includes two cutting needles, one of which cuts one bridge structure 2 connected to the buckle structure 101, where the specific cutting position is a weak point N2. The cutting principle of the other sets of cutting needles 43 is the same, and various cutting needles 43 simultaneously cuts the respective bridge structures 2, thereby forming the package structure 000.

Further, in combination with the above embodiments, the buckle assembly 100 further includes a support 103. The cutting needles 43 may be used to cut at connection positions between the buckle structures 101 and the support 103. As shown in FIGS. 8*d*, 9*a* and 9*b*, a handle 421 on the female jig core 42 is manually or automatically pressed, and cutting needles 43 are used to cut the plastic frame structure 102 the support 103 at the same time. Specifically, one set of cutting needles 43 includes three cutting needles. Two of the three cutting needles are used to cut two bridge structures 2 connected to the buckle structure 101, where the specific cutting position is a weak point N2. The remaining cutting needle 43 is used to cut one branch end part 31 connected to the buckle structure 101, where the specific cutting position is a weak point N1.

Figure 10:
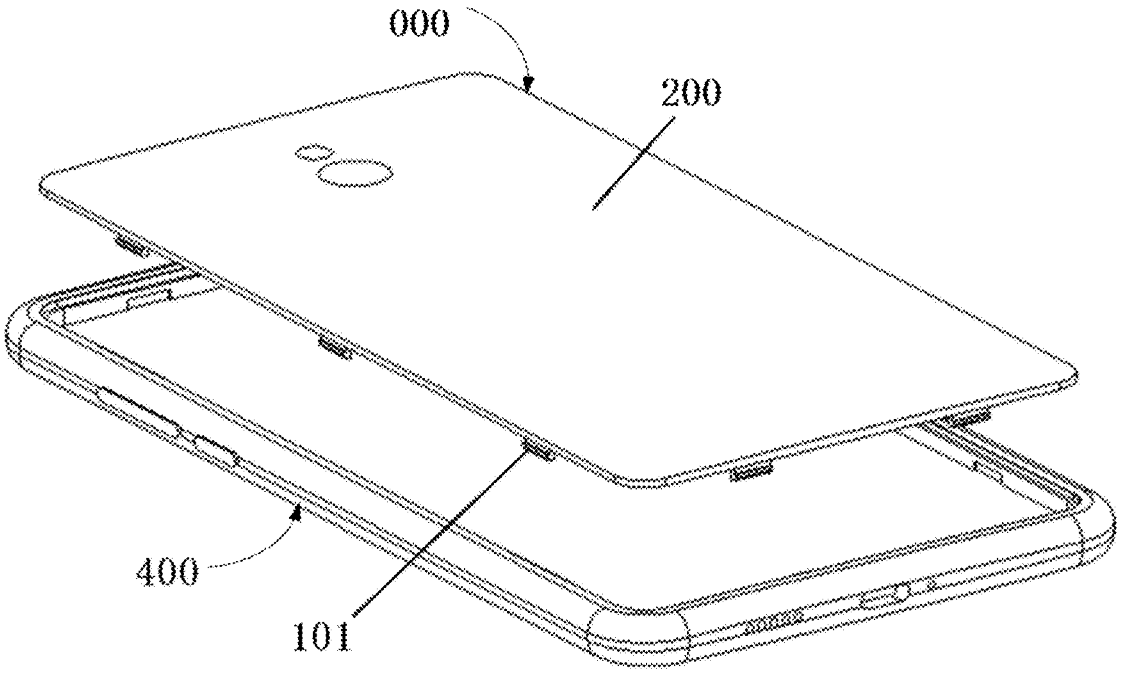
FIG. 10 is a schematic diagram illustrating a glass rear cover assembled with an electronic product body according to an embodiment of the present disclosure.

In combination with the above embodiments, a detachable glass rear cover structure (i.e., the package structure 000 according to the present disclosure) can be manufactured. FIG. 10 is a schematic diagram illustrating a glass rear cover assembled with an electronic product body according to an embodiment of the present disclosure. As shown in FIG. 10, with the glass rear cover 000 formed by combining the glass sheet 200 and the buckle structures 101, detachably connection to the electronic product body 400 can be implemented, thereby satisfying the requirements of removing the rear cover and replacing the battery by oneself.

Figure 11:
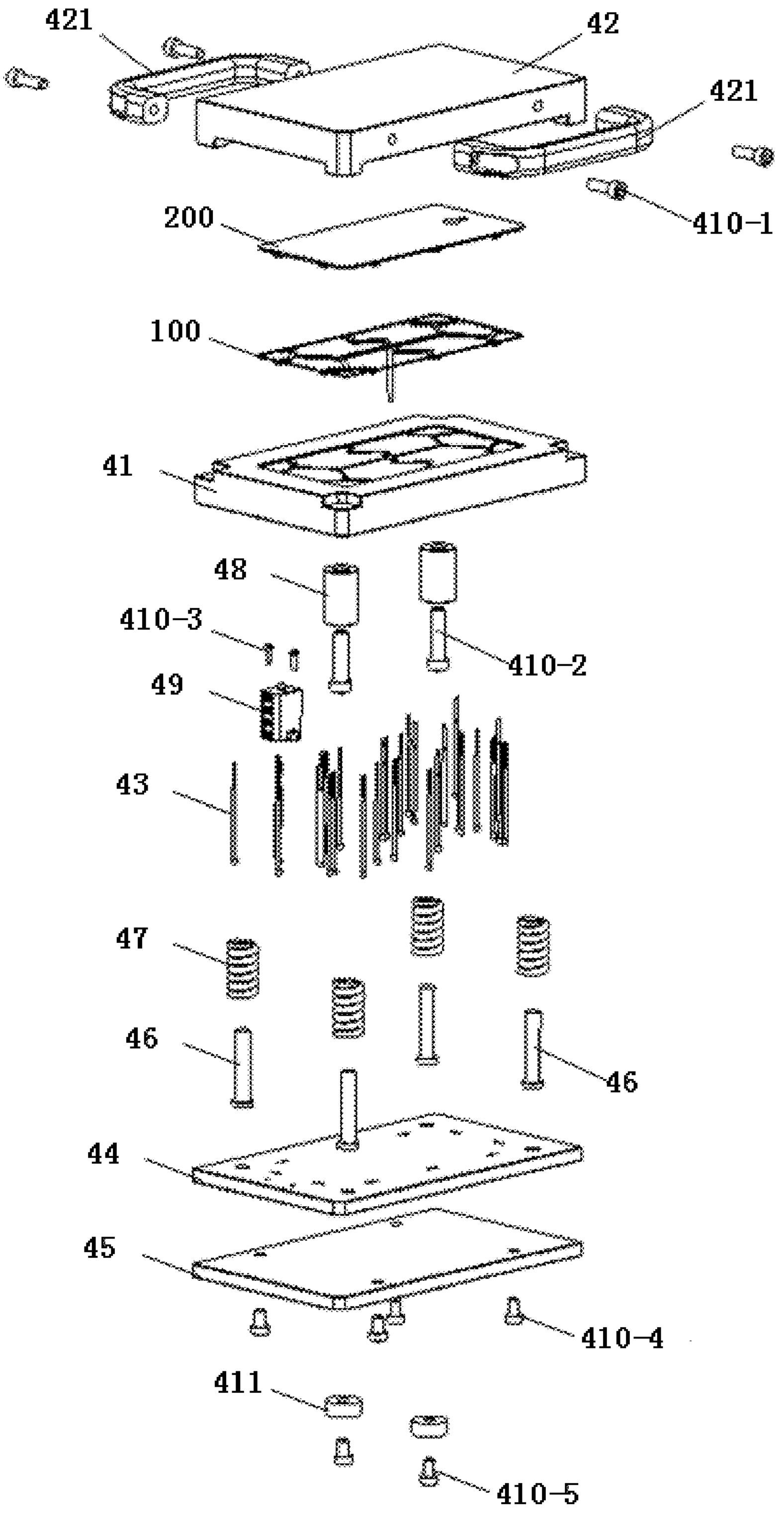
FIG. 11 is an exploded view of a pressing and cutting jig according to an embodiment of the present disclosure.

An embodiment of the present disclosure further provides a pressing and cutting jig 300 for manufacturing a package structure 000 of an electronic product, such as a removable glass rear cover of a mobile phone. FIG. 11 is an exploded view of a pressing and cutting jig according to an embodiment of the present disclosure. As shown in FIGS. 8*d* and 11, the pressing and cutting jig 300 includes a male jig core 41, a female jig core 42, a plurality of sets of cutting needles 43, a cutting needle plate 44, a cutting needle baffle 45, and a guide post 46. The cutting needle plate 44 is disposed on the cutting needle baffle 45. The male jig core 41 has a guide post through hole. The guide post 46 is fixed on the cutting needle plate 44 and passes through the guide post through hole to be movably connected to the male jig core 41. The plurality of sets of cutting needles 43 are disposed between the cutting needle baffle 45 and the male jig core 41, and each set of cutting needles 43 passes through the through holes in the cutting needle plate 44 to be fixed by the cutting needle baffle 45. The female jig core 42 is positioned on a side of the male jig core 41 away from the cutting needle plate 44, and detachably connected to the male jig core 41. An internal cavity of the male jig core 41 has the same pattern as the buckle assembly 100. An internal cavity formed by the female jig core 42 and the male jig core 41 assembled with each other is used for accommodating the buckle assembly 100 and the glass sheet 200. The buckle assembly 100 is a buckle assembly 100 as described in any of the above embodiments. As shown in FIG. 9*b*, each set of cutting needles 43 is configured to cut at a connection position between one of the buckle structures 101 and the plastic frame structure 102. One set of cutting needles 43 includes at least two cutting needles.

It should be noted that for the functions of the main structures in the pressing and cutting jig 300, reference may be made to the steps S121 to S123 in the method for manufacturing the package structure 000, and repeated descriptions are omitted here.

In some embodiments, as shown in FIG. 9*b*, the buckle assembly 100 further includes a support 103; and each set of cutting needles 43 is further configured to cut at a connection position between one of the buckle structures 101 and the support 103.

Exemplarily, in combination with the above embodiments, one set of cutting needles 43 includes three cutting needles, two of which are used to cut two bridge structures 2 connected to the buckle structure 101, where the specific cutting position is a weak point N2. The remaining cutting needle 43 is used to cut one branch end part 31 connected to the buckle structure 101, where the specific cutting position is a weak point N1.

In some embodiments, as shown in FIG. 11, the pressing and cutting jig 300 further includes a spring 47. The spring 47 is nested on the guide post 46 and configured to reset the pressing of the female jig core 42 to the male jig core 41. For example, after the buckle assembly 100 is cut by manually or automatically pressing the female jig core 42, the pressure is released, and the spring 47 immediately springs back and resets the male jig core 41 and the female jig core 42, thereby improving the cutting efficiency of the buckle assembly 100.

In some embodiments, as shown in FIG. 11, the pressing and cutting jig 300 further includes a stopper 48. To prevent the cutting needle 43 from puncturing the glass sheet 200, a maximum stroke L of the cutting needle 43 is strictly controlled by the stopper 48. Specifically, the stopper 48 is disposed between the cutting needle plate 44 and the male jig core 41, and fixed onto a surface of the male jig core 41 close to the cutting needle plate 44. When the pressing and cutting jig 300 is not in a working state, a first distance between a surface of the stopper 48 close to the cutting needle plate 44 and a surface of the cutting needle plate 44 close to the male jig core 41 is less than a thickness of a bridge body part 22. The first distance is greater than a minimum thickness of a branch end part 31 in a first direction Y, and greater than a minimum thickness of a bridge end part 21 in the first direction Y.

Here, the first distance is the maximum stroke L of the cutting needle 43. The thickness of the bridge body part 22 is a third thickness H3. The minimum thickness of the branch end part 31 in the first direction Y is a second thickness H2. The minimum thickness of the bridge end part 21 in the first direction Y is a fourth thickness H4. In other words, the maximum stroke L is less than the third thickness H3, and greater than a maximum one of the second thickness H2 and the fourth thickness H4, i.e., $\max(H2, H4) < L < H3$.

In some embodiments, as shown in FIGS. 8*d* and 11, the pressing and cutting jig 300 further includes a counter 49 fixed onto the cutting needle plate 44. The counter 49 is configured to record the number of cuts and feed back information to a management department to facilitate management and statistics of the manufactured products.

As shown in FIG. 11, the connection relationship of the structures in the pressing and cutting jig 300 will be described in detail below with reference to an example. Exemplarily, the cutting needle plate 44 is provided with a plurality of stepped through holes, and the number of stepped through holes is the same as the number of sets of cutting needles 43. Each cutting needle 43 has a cutting edge end and a fixing end corresponding to the cutting edge end. The fixing end has a stepped structure. The cutting edge end of the cutting needle 43 passes through one of the stepped through holes, with the stepped structure matched with the stepped through hole, and then fixed by the cutting needle baffle 45 blocking the stepped through hole. The cutting needle plate 44 is locked with the cutting needle baffle 45 by four screws 410-4. A fixing end of the guide post 46 has a stepped structure. Based on the same fixing principle as the cutting needle 43, one end of the guide post 46 passes through one of the stepped through holes in the cutting needle plate 44, with the stepped structure at the fixing end matched with the stepped through hole, and then fixed by the cutting needle baffle 45 blocking the stepped through hole. The spring 47 is nested on the guide post 46. The male jig core 41 has a guide post through hole. The guide post 46 passes to be movably connected to the male jig core 41 through guide post through hole. When the pressing and cutting jig 300 is not in a working state, the male jig core 41 is supported by the reset spring 47. A stopper 48 for limiting the stroke is fixed to a bottom surface of the male jig core 41 by a screw 410-2; and the counter 49 is fixed to the cutting needle plate 44 by a screw 410-3. A handle 421 is fixed to the female jig core 42 by a screw 410-1, and the female jig core 42 is detachably connected to the male jig core 41.

Figure 12:
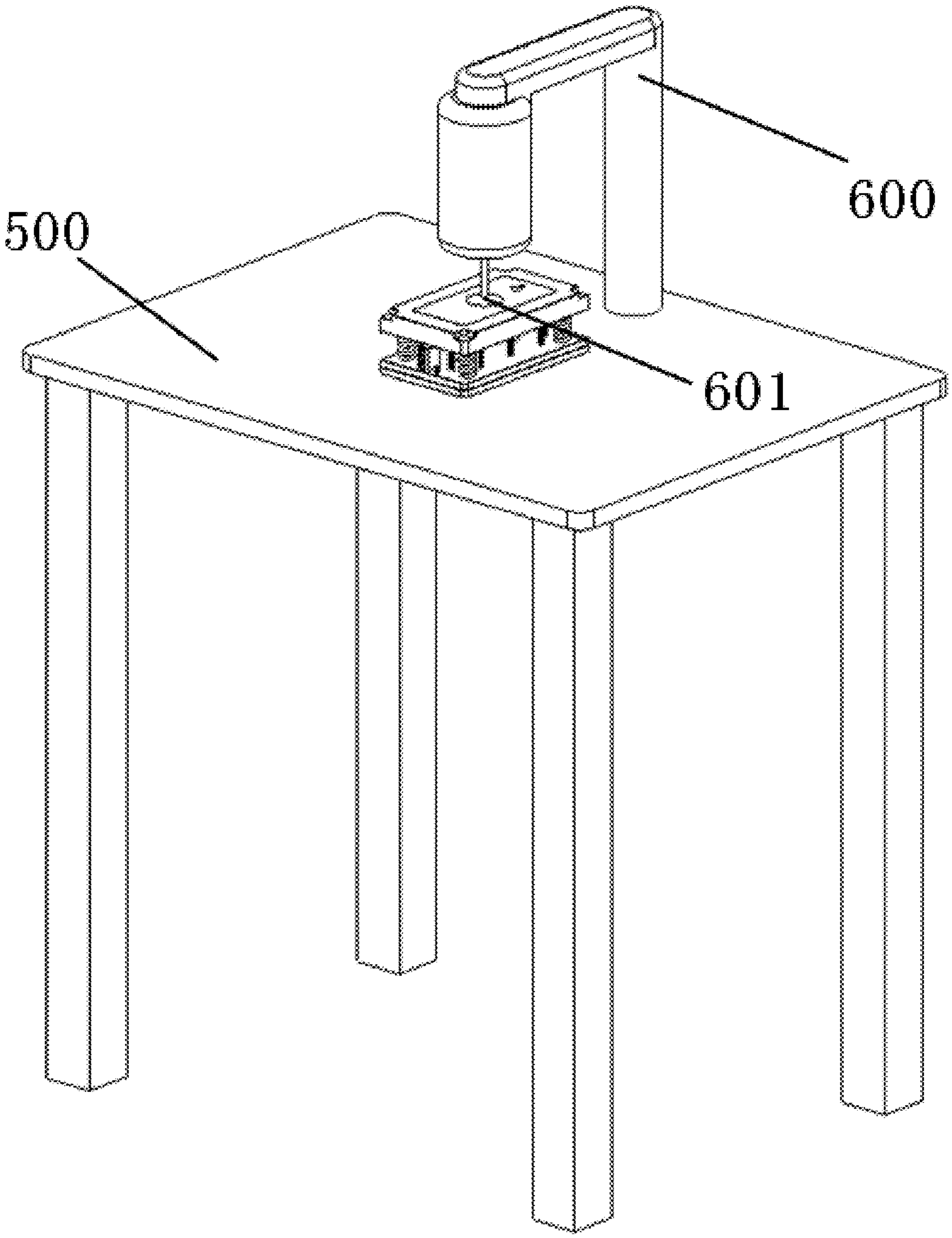
FIG. 12 is a schematic diagram of an apparatus for manufacturing a package structure according to an embodiment of the present disclosure.

An embodiment of the present disclosure further provides an apparatus for manufacturing a package structure 000, which can implement automatic or semi-automatic manufacturing of the package structure 000 of an electronic product, for example, implement manufacturing of a detachable glass rear cover of a mobile phone. FIG. 12 is a schematic diagram of an apparatus for manufacturing a package structure according to an embodiment of the present disclosure. As shown in FIG. 12, the apparatus for manufacturing a package structure includes a pressing and cutting jig 300 as described in any of the above embodiments.

In some embodiments, the apparatus for manufacturing a package structure further includes a workbench 500 and a manipulator 600. As shown in FIG. 12, the pressing and cutting jig 300 is disposed on the workbench 500. Specifically, the cutting needle baffle 45 may be fixed on the workbench 500 by a screws 410-5 and a positioning block 411, so as to fix the pressing and cutting jig 300 on the workbench 500.

It should be noted that for the specific structure of the pressing and cutting jig 300, reference may be made to the detailed description in the embodiment of the pressing and cutting jig 300, and repeated descriptions are omitted here. For the detailed pressing and cutting process of the pressing and cutting jig 300, reference may be made to the detailed description in the embodiment of the method for manufacturing a package structure, and repeated descriptions are omitted here.

The manipulator 600 may be disposed on the workbench 500 or on the ground. The manipulator 600 is configured to assemble or separate the female jig core 42 and the male jig core 41; and/or, take a finished package structure 000 out of the male jig core 41. Exemplarily, during a bonding and dwell process, the manipulator 600 assemblies the female jig core 42 with the male jig core 41 by a suction disk 601. When the buckle assembly 100 is cut, the manipulator 600 separates the female jig core 42 from the male jig core 41 by the suction disk 601, and takes the finished package structure 000 out of an internal cavity of the male jig core 41, thereby implementing automatic manufacturing of the package structure 000, improving production efficiency and saving the labor cost.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. A buckle assembly, comprising a plurality of buckle structures, one plastic frame structure, and one support; wherein an outer contour of the plastic frame structure is matched with an outer contour of a housing of an electronic product; the plastic frame structure is provided with a plurality of openings, and each buckle structure is embedded into one of the openings;

the support is disposed in an annular area defined by the plastic frame structure; the support is divided into a plurality of branches each having a first end and a second end, first ends of different branches are connected, while the second end of each branch is connected to one of the buckle structures; and the plurality of buckle structures, the plastic frame structure and the support form an integral structure by injection molding.

2. The buckle assembly according to claim 1, wherein each branch comprises a branch end part at the second end, and a branch body part integrally formed with the branch end part;

the branch end part has a first surface connected to one of the buckle structures, and a second surface and a third surface which are connected to the first surface, wherein a connection position between the first surface and the second surface is opposite to a connection position between the first surface and the third surface in a first direction;

each of the buckle structures comprises a buckle body part and a buckle connection part integrally formed with the buckle body part; the second end of the branch is connected to the buckle body part, and the second surface is farther away from the buckle connection part than the third surface; and a connection surface between the buckle body part and the branch forms a first dihedral angle with the second surface, wherein the first dihedral angle is smaller than 90°.

3. The buckle assembly according to claim 2, wherein the buckle body part has a first thickness in a direction toward the branch end part connected to the buckle body part; a connection position between the branch end part and the buckle body part has a second thickness in the first direction; and the second thickness is less than or equal to half of the first thickness.

4. The buckle assembly according to claim 2, wherein the branch body part comprises a fourth surface connected to the second surface;

each of the buckle structures has a fifth surface connected to the branch end part, and a sixth surface and a seventh surface which are connected to the fifth surface, wherein a connection position between the fifth surface and the sixth surface is opposite to a connection position between the fifth surface and the seventh surface in the first direction; and an extension plane of the fourth surface is flush with an extension plane of the sixth surface.

5. The buckle assembly according to claim 1, wherein each of the branches has the same path length from the first end to the second end.

6. The buckle assembly according to claim 1, wherein the plastic frame structure comprises a multi-segment bridge structure, wherein the multi-segment bridge structure comprises two bridge end parts and a bridge body part sandwiched between the two bridge end parts;

each bridge end part has an eighth surface connected to one of the buckle structures, and a ninth surface and a tenth surface which are connected to the eighth surface, wherein a connection position between the eighth surface and the ninth surface is opposite to a connection position between the eighth surface and the tenth surface in a first direction;

each of the buckle structures comprises a buckle body part and a buckle connection part integrally formed with the buckle body part; the bridge end part is connected to the buckle body part, and the ninth surface is farther away from the buckle connection part than the tenth surface; and a connection surface between the buckle body part and the bridge end part forms a third dihedral angle with the ninth surface, wherein the third dihedral angle is smaller than 90°.

7. The buckle assembly according to claim 6, wherein the bridge body part has a third thickness in the first direction; a connection position between the bridge end part and the buckle body part has a fourth thickness in the first direction; and the fourth thickness is less than or equal to half of the third thickness.

8. The buckle assembly according to claim 6, wherein the bridge body part comprises an eleventh surface and a twelfth surface disposed opposite to each other in the first direction;

each of the buckle structures has a fifth surface connected to the plastic frame structure, and a sixth surface and a seventh surface which are connected to the fifth surface, wherein a connection position between the fifth surface and the sixth surface is opposite to a connection position between the fifth surface and the seventh surface in the first direction; and an extension plane of the eleventh surface is flush with an extension plane of the sixth surface.

9. The buckle assembly according to claim 1, wherein the plurality of buckle structures are centrosymmetric about a center of the plastic frame structure.

10. The buckle assembly according to claim 1, wherein the support is centrosymmetric about a center of the plastic frame structure.

11. A method for manufacturing a package structure, comprising:

providing a buckle assembly and a housing, wherein the buckle assembly is a buckle assembly according to claim 1; and connecting the buckle assembly with the housing, and removing the plastic frame structure and the support from the buckle assembly to form a package structure.

12. The method for manufacturing a package structure according to claim 11, wherein connecting the buckle assembly with the housing and removing the plastic frame structure and the support from the buckle assembly comprises:

providing a pressing and cutting jig, wherein the pressing and cutting jig comprises at least a male jig core, a female jig core and a plurality of sets of cutting needles;

placing the buckle assembly into an internal cavity of the male jig core, and bonding the housing onto the buckle assembly by a bonding structure; assembling the female jig core with the male jig core, wherein the internal cavity of the male jig core has the same pattern as the buckle assembly; and pressing a structure obtained by bonding the buckle assembly and the housing with the female jig core, to enable each set of cutting needles to cut at a connection position between one of the buckle structures and the plastic frame structure, thereby forming the package structure.

13. The method for manufacturing a package structure according to claim 12, wherein forming the package structure further comprises: cutting at a connection position between each of the buckle structures and the support with the cutting needles.

14. A pressing and cutting jig, comprising a male jig core, a female jig core, a plurality of sets of cutting needles, a cutting needle plate, a cutting needle baffle and a guide post; wherein the cutting needle plate is disposed on the cutting needle baffle; the male jig core has a guide post through hole; the guide post is fixed on the cutting needle plate and passes through the guide post through hole to be movably connected to the male jig core; the plurality of sets of cutting needles are disposed between the cutting needle baffle and the male jig core, and each set of cutting needles passes through stepped through holes in the cutting needle plate to be fixed by the cutting needle baffle; the female jig core is positioned on a side of the male jig core away from the cutting needle plate, and detachably connected to the male jig core;

an internal cavity of the male jig core has the same pattern as a buckle assembly; and an internal cavity formed by the female jig core and the male jig core assembled with each other is used for accommodating the buckle assembly and a housing; the buckle assembly is a buckle assembly according to claim 1; and each set of cutting needles is configured to cut at a connection position between one of the buckle structures and the plastic frame structure.

15. The pressing and cutting jig according to claim 14, wherein each set of cutting needles is further configured to cut at a connection position between one of the buckle structures and the support.

16. The pressing and cutting jig according to claim 14, wherein the pressing and cutting jig further comprises a spring; wherein the spring is nested on the guide post and configured to reset the pressing of the female jig core to the male jig core.

17. The pressing and cutting jig according to claim 14, wherein the pressing and cutting jig further comprises a stopper; wherein the stopper is disposed between the cutting needle plate and the male jig core, and fixed onto a surface of the male jig core close to the cutting needle plate; and when the pressing and cutting jig is not in a working state, a first distance between a surface of the stopper close to the cutting needle plate and a surface of the cutting needle plate close to the male jig core is less than a thickness of a bridge body part, and the first distance is greater than a minimum thickness of a branch end part in a first direction, and greater than a minimum thickness of a bridge end part in the first direction.

18. The pressing and cutting jig according to claim 14, wherein the pressing and cutting jig further comprises a counter fixed onto the cutting needle plate and configured to record the number of cuts.

19. An apparatus for manufacturing a package structure, comprising a pressing and cutting jig according to claim 14.

20. The apparatus for manufacturing a package structure according to claim 19, wherein the apparatus further comprises a workbench and a manipulator;

the pressing and cutting jig is disposed on the workbench, and the manipulator is configured to assemble or separate the female jig core and the male jig core; and/or take a finished package structure out of the internal cavity of the male jig core.

* * * * *